United States Patent
Lee

(10) Patent No.: US 6,504,586 B1
(45) Date of Patent: *Jan. 7, 2003

(54) LIQUID CRYSTAL DISPLAY MODULES AND HOLDING ASSEMBLIES APPLIED TO THE SAME

(75) Inventor: Sang-hwan Lee, Kyonggi-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

This patent is subject to a terminal disclaimer.

(21) Appl. No.: 09/300,483

(22) Filed: Apr. 28, 1999

(30) Foreign Application Priority Data

Sep. 24, 1998 (KR) .............................. 98-39586

(51) Int. Cl.⁷ ......................................... G02F 1/1333
(52) U.S. Cl. ........................................................ 349/58
(58) Field of Search .............................. 349/58, 62, 63, 349/67, 150, 59; 359/48, 83; 361/681

(56) References Cited

U.S. PATENT DOCUMENTS

| | | | |
|---|---|---|---|
| 5,387,922 A | 2/1995 | Yun | 345/103 |
| 5,442,470 A * | 8/1995 | Hashimoto | 359/83 |
| 5,477,422 A | 12/1995 | Hooker et al. | 362/29 |
| 5,477,779 A | 12/1995 | Kawabe | 101/116 |
| 5,510,915 A | 4/1996 | Ge et al. | 359/59 |
| 5,620,129 A | 4/1997 | Rogren | 228/56.3 |
| 5,665,607 A | 9/1997 | Kawama et al. | 438/64 |
| 5,684,555 A | 11/1997 | Shiba et al. | 349/149 |
| 5,729,316 A | 3/1998 | Yamamura et al. | 349/150 |
| 5,777,611 A | 7/1998 | Song | 345/212 |
| 5,838,412 A * | 11/1998 | Ueda et al. | 349/150 |
| 6,046,785 A * | 4/2000 | Won | 349/58 |
| 6,091,474 A * | 7/2000 | Middleton et al. | 349/149 |
| 6,175,396 B1 * | 1/2001 | Kim et al. | 349/58 |

* cited by examiner

Primary Examiner—Toan Ton
Assistant Examiner—Hoan Nguyen
(74) Attorney, Agent, or Firm—McGuireWoods LLP; Hae-Chan Park

(57) ABSTRACT

A liquid crystal display (LCD) module and a holding assembly applied to the LCD module is disclosed. In the present invention, a holder is electrically connected to an earth terminal of a printed circuit board (PCB) and a top chassis so that an electromagnetic wave exhaust passage can be formed. Thereby, the electromagnetic wave emitted from the PCB is exhausted through the top chassis. In addition, when the sheets are settled in a mold frame, the holder is inserted into a holding opening of the mold frame so that the sheets can be stably held and the sheets can be prevented from moving in advance. In this case, the holder can serve the typical electromagnetic wave exhausting function and sheet fixing function. Accordingly, there is no need to use a fixing tape for fixing the sheets. Therefore, wrinkling phenomena occurring on the surfaces of the sheets can be prevented in advance.

8 Claims, 3 Drawing Sheets

LIQUID CRYSTAL DISPLAY MODULES AND HOLDING ASSEMBLIES APPLIED TO THE SAME

BACKGROUND OF THE INVENTION

1. Field of the Invention

The present invention relates to liquid crystal display (LCD) modules, and more particularly to LCD modules having an improved structure for preventing sheets from being wrinkled. Moreover, the present invention relates to holding assemblies applied to the LCD modules.

2. Description of the Related Art

Image display devices are widely used for displaying information. Liquid crystal displays (LCD) are widely used as image display devices. For example, LCDs are widely favored as substitute for a cathode ray tube (CRT), among other reasons because they are thin, light and consumes much less power.

There is disclosed structures of the LCDs in detail in U.S. Pat. No. 5,387,922 entitled 'Apparatus for driving an LCD module with one driving circuit', U.S. Pat. No. 5,510,915 entitled 'Out active matrix LCD', U.S. Pat. No. 5,684,555 entitled 'Liquid crystal display panel', U.S. Pat. No. 5,729,316 entitled 'Liquid crystal display module', U.S. Pat. No. 5,777,611 entitled 'Apparatus for controlling power sequence of an LCD module' and so on.

Such a conventional LCD includes a plurality of sheets inserted between a front face of a light guide plate and an LCD panel. The sheets are, for example, diffusion sheets for diffusing light from the light guide plate and enhancing the brightness of the light, prism sheets for concentrating the light from the light guide plate and enhancing view angle, and protecting sheets for protecting the diffusing sheets and the prism sheets from being damaged.

The light guide plate and the sheets are fixed by means of fixing tape, for example, two-sided tape to be prevented from slipping out by external impacts. The light guide plate and the sheets are fixed to a mold frame by means of two-sided tape attached to the bottom of the mold frame, to stabilize the structure of the LCD module.

The technologies for fixing components by means of an adhering member such as a tape are applied to various field and disclosed in U.S. Pat. No. 5,477,779 entitled 'Printing drum and method for attaching heat shrinkable screen', U.S. Pat. No. 5,665,607 entitled 'Method for producing thin film solar cell', U.S. Pat. No. 5,620,129 entitled 'Device and method for forming and attaching an array of conductive balls', and U.S. Pat. No. 5,477,422 entitled 'Illuminated LCD apparatus' and so on.

In the conventional LCDs, the LCD panel typically displays image information utilizing light supplied from a lamp. The lamp generates heat of high temperature as well as light. The heat generated from the lamp affects various members arranged in the mold frame, for example, the sheets, expanding the sheets to a certain degree.

Since the sheets are fixedly adhered to the mold frame by directly contacting the fixing tape, only a certain limited room is allowed for the thermal expansion of the sheets, although the sheets may expand more by the heat from the lamp.

In this case, the fixing force by the fixing tape and the expansion force by the heat create a high stress concentrated on the surfaces of the sheets.

Particularly, the sheets are very thin and accordingly more vulnerable to stress than other members. Accordingly, a little concentration of stress may seriously wrinkle the sheets.

With wrinkles, the sheets cannot perform its function to its full extent. As a result, the whole display quality of the LCD is considerably degraded.

SUMMARY OF THE INVENTION

It is therefore an object of the present invention to prevent movements of the sheets without using any fixing tape.

It is another object of the present invention to fix the sheets without any fixing tape, preventing stress concentration on the sheets.

It is still another object of the present invention to block off the stress concentration on the sheets, preventing deformation of the sheets.

It is still another object of the present invention to prevent deformation of the sheets, enhancing display performance of an LCD.

The above and other objects of the present invention will be more apparent from the following description and attached drawings.

To achieve the above and other objects, the present invention eliminates a fixing tape acting as a limitation to thermal expansion of the sheets, provides a mold frame having an improved structure and a holder to combine the sheets with the mold frame. The holder functions to exhaust electromagnetic wave and also functions to fix the sheets to the mold frame.

For example, the holder is electrically connected to an earth terminal of a printed circuit board (PCB) and a top chassis to form an electromagnetic wave exhaust passage. The electromagnetic wave output from the PCB is exhausted through the top chassis. When the sheets are inserted into the mold frame, the holder is inserted into a holding opening of the mold frame so that the sheets can be fixedly held, whereby preventing the movements of the sheets in advance. In this case, the holder simultaneously functions as the electromagnetic wave exhaust and the sheet fixing element, as aforementioned. Of course, the fixing tape for fixing the sheets is not used in this case.

A fixing projection for fixing the sheets is further formed in the holding opening of the mold frame by protruding the mold frame upwardly. In this case, the sheets are fixed by means of the fixing projection besides the holder. Accordingly, the sheets are not moved even by a strong external impact.

In addition, a pair of support projections for supporting the holder are further formed in the holding opening on both sides of the fixing projection by protruding the mold frame upwardly. In this case, the support projections prevents the holder from pressing the sheets excessively. As a result, an enough thermal expansion space for the sheets can be secured.

As aforementioned, the present invention expands the function of a PCB earth clip: the sheet holding function as well as the typical PCB grounding function. Through the expanded functions, the sheets can be appropriately fixed in the mold frame and space enough for thermal expansion of the sheets can be secured. Therefore, unexpected wrinkling of the sheets can be avoided in advance.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein.

Figure 1:
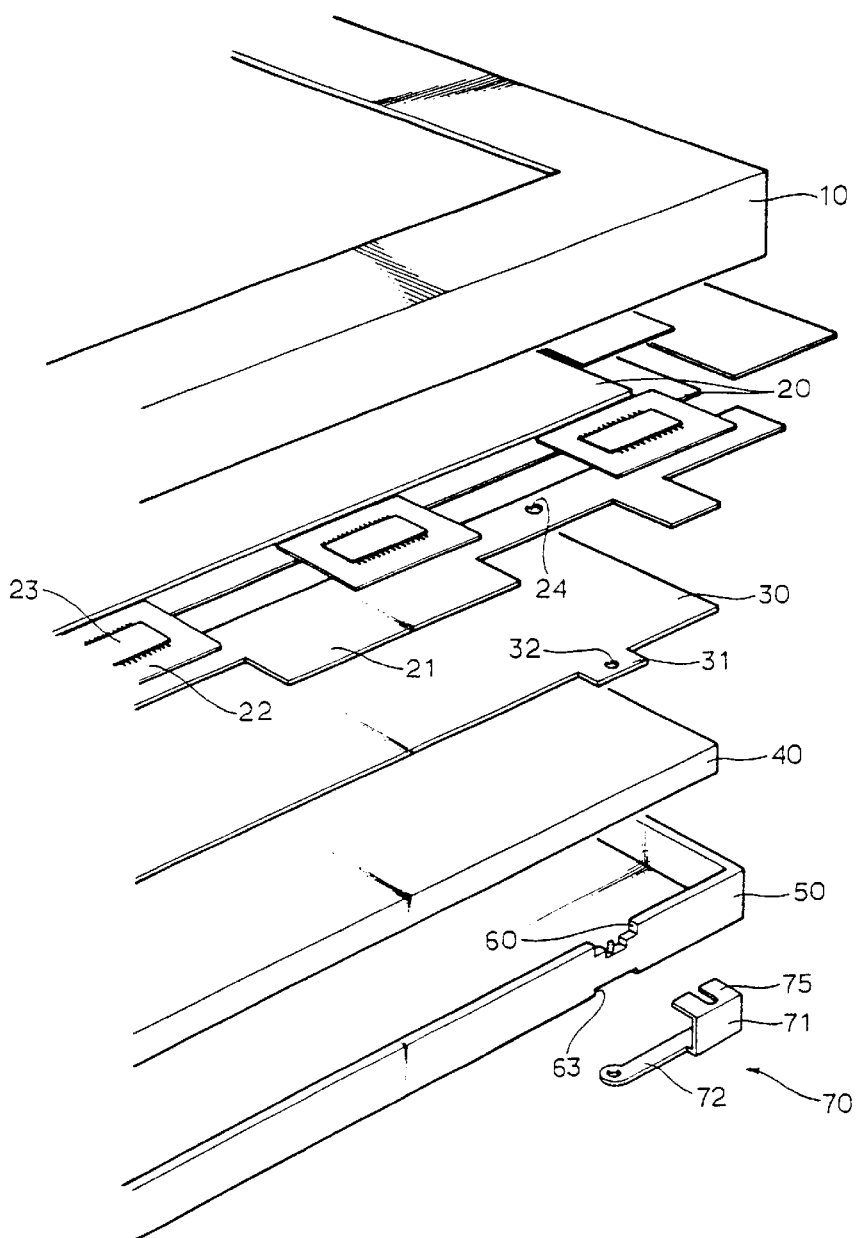
FIG. 1 is a perspective view of the details of an LCD module according to the present invention.

As shown in FIG. 1, the LCD module according to the present invention includes a lamp (not shown) to supply light for image information display located at an internal end of a mold frame 50 which supports internal components. A light guide plate 40 for receiving light from the lamp and uniformly transmitting the light to an LCD panel 20 is settled in the mold frame 50 adjacent to the lamp.

A plurality of sheets 30 are inserted between the front face of the light guide plate 40 and the LCD panel 20. The sheets 30 are, for example, diffusing sheets for diffusing light from the light guide plate 40 and enhancing the brightness of the light, prism sheets for concentrating the light from the light guide plate 40 and enhancing the view angle, and protecting sheets for protecting the diffusing sheets and the prism sheets from damage.

The above components are covered by a top chassis 10, for example, of stainless steel, enclosing the edges of the mold frame 50 so that the components can be protected from the external impact.

A PCB 21 including a plurality of circuit patterns is arranged at one end of the LCD panel 20 and electrically connected to the LCD panel 20. The PCB 21 is driven by control signals input from outside to control the LCD panel 20.

The PCB 21 is mounted on the LCD panel 20 by a tape automated bonding (TAB) 22 with a semiconductor chip 23 loaded thereon via an anisotropic conductive film (ACF) (not shown). The TAB 22 interconnects the PCB 21 and the LCD panel 20 so that control signals output from the PCB 21 can be rapidly transmitted to the LCD panel 20.

The PCB 21 controls the LCD utilizing signals in a high-frequency wave. As a result, a great amount of electromagnetic wave is inevitably generated in the PCB 21. The electromagnetic wave obstructs normal operation of the LCD and degrades the display performance of the LCD. To overcome such a problem, an earth terminal 24 for grounding the electromagnetic wave is formed in a predetermined area of the PCB 21.

Figure 2:
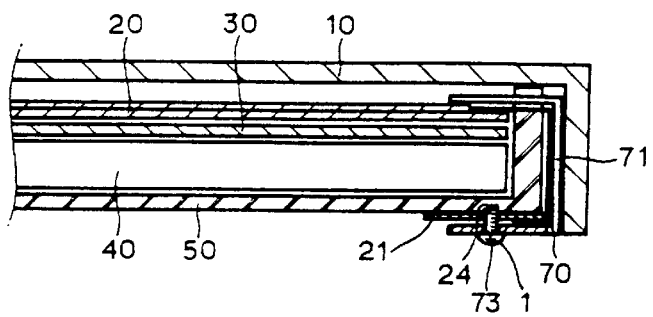
FIG. 2 is a cross sectional view of the LCD module of FIG. 1.

When the aforementioned components of the light guide plate 40, the sheets 30, the LCD panel 20 and others are settled in the mold frame 50 and the components are enclosed by the top chassis 10, the PCB 21 arranged at an end of the LCD panel 20 is, for example, located on the rear face of the mold frame 50 with the TAB 22 folded as shown in FIG. 2. It is apparent to those skilled in the art that the TAB 22 is not damaged even though the TAB 22 is folded for mounting the PCB 21 because the TAB 22 has a great flexibility.

When the PCB 21 is located on the rear face of the mold frame 50 with the TAB 22 folded, the earth terminal 24 of the PCB 21 comes in contact with the holder 70 and forms an electromagnetic wave exhaust passage associated with the top chassis 10, whereby the electromagnetic wave emitted from the PCB 21 can be rapidly exhausted outside.

In the prior art, when the PCB is located on the rear face of the mold frame, a PCB earth clip is inserted into an end of the mold frame and combined with the earth terminal of the PCB and a portion of the PCB earth clip is in contact with the top chassis. Then, an electromagnetic wave exhaust passage is formed. In this manner, the conventional PCB earth clip serves only electromagnetic wave exhausting functions.

However, in the present invention, the shape of the PCB earth clip is improved to form a holder 70 and the PCB earth clip can also fix the sheets as well as work as the typical electromagnetic wave exhaust.

In other words, according to the present invention, the PCB earth clip is structured to be a holder for holding the other components in the LCD module. For example, the sheets 30 and the shape of the mold frame 50 onto which the PCB earth clip is mounted is also improved. The improved PCB earth clip and mold frame 50 are put together to form a new holding assembly for an LCD module of the present invention. In this case, the sheets 30 can be favorably fixed in the mold frame 50 without using the fixing tape.

Figure 3:
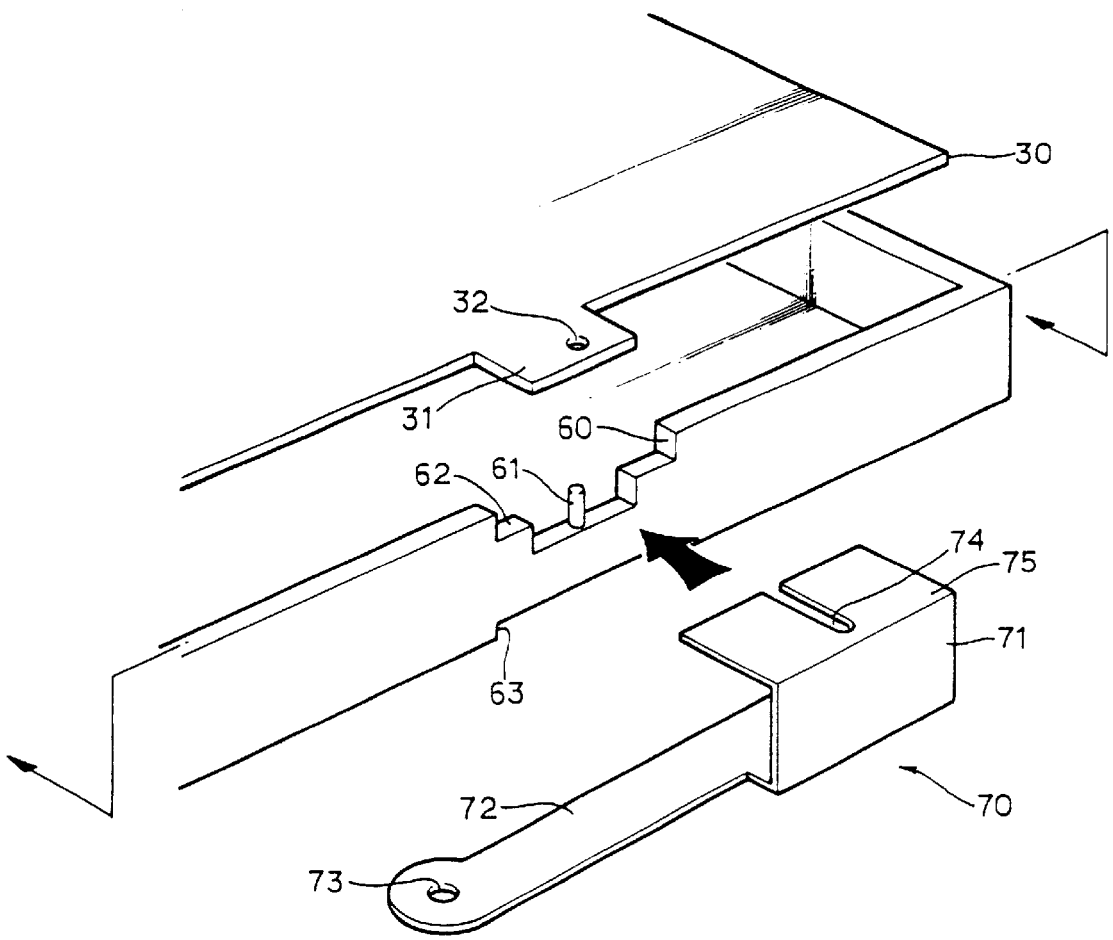
FIG. 3 is a perspective view of the details of a holding assembly for a first embodiment of an LCD module according to the present invention.

The holding assembly for an LCD module of the present invention is obtained by combining of the mold frame 50 and the holder 70 as shown in FIG. 3.

The holder 70 includes a top plate 75, a side plate 71 and a bottom plate 72 formed in one body. The bottom plate 72 is facing the top plate 75, folded on the front face of the side plate 71, for example, at a right angle and extends longitudinally along the edge of the mold frame 50. An electromagnetic exhaust terminal 73 is formed at an end of the bottom plate 72 corresponding to the earth terminal 24 of the PCB 21.

When the PCB 21 is located on the rear face of the mold frame 50 with the TAB 22 folded, all the components are settled in the mold frame 50, and all the components are enclosed by the top chassis 10, the holder 70 is inserted into an end of the mold frame 50 so that the electromagnetic wave emitted from the PCB 21 can be rapidly exhausted outside. At this time, the side plate 71 of the holder 70 is facing the side of the mold frame 50.

When the holder 70 is inserted into the mold frame 50, the side plate 71 of the holder 70 comes in contact with the top chassis 10 enclosing the mold frame 50, and the electromagnetic wave exhaust terminal 73 of the bottom plate 72 comes in contact with the earth terminal 24 of the PCB 21 located on the rear face of the mold frame 50 by means of, for example, a screw 1. As a result, the top chassis 10 and PCB 21 form an electromagnetic wave exhaust passage via the holder 70. Through the holder 70, the electromagnetic wave emitted from the PCB 21 is rapidly exhausted to the top chassis 10.

As aforementioned, when the PCB 21 is located on the rear face of the mold frame 50, the holder 70 of the present invention first serves as electromagnetic wave exhaust by being inserted into an end of the mold frame 50 and combined with the earth terminal 24 of the PCB 21 in such a manner that the side plate 71 thereof comes in contact with the top chassis 10 to form an electromagnetic wave exhaust passage. The electromagnetic wave emitted from the PCB 21 is exhausted through the holder 70.

A holding opening 60 is formed in the side of the mold frame 50 as shown in FIG. 3. The holding opening 60 lets the sides of the sheets 30 protrude outside of the mold frame 50 when the sheets 30 are settled in the mold frame 50.

For the electromagnetic wave exhausting function, the holder 70 is inserted into an end of the mold frame 50 using the holding opening 60. A holder fixing opening 63 is further formed at the bottom of the mold frame 50. The holder fixing opening 63 allows the bottom plate 72 of the holder 70 to be smoothly inserted into the mold frame 50 and assists the holder 70 not to be slipped out from the mold frame 50 after being inserted When the holder 70 is inserted into an end of the mold frame 50 through the holding opening 60 and the holder fixing opening 63, the PCB 21 and the top chassis 10 are in contact with the holder 70 and form an electromagnetic wave exhaust passage via the holder 70.

When the holder 70 is inserted into an end of the mold frame 50, the top plate 75 of the holder 70 naturally holds the sides of the sheets 30 exposed by the holding opening 60. At the same time, the bottom plate 72 is firmly inserted into the holder fixing opening 63 in contact with the earth terminal 24 of the PCB 21. The side plate 71 comes in contact with the top chassis 10 enclosing the edges of the mold frame 50. In this case, the height of the side plate 71 is approximately the same as the distance between the holding opening 60 and the holder fixing opening 63 so that the holder 70 can be firmly inserted into an end of the mold frame 50 through the holding opening 60 and the holder fixing opening 63.

A fixing projection 61 having, for example, a cylindrical shape is further formed in the holding opening 60 by protruding the mold frame 50 upwardly. Openings 32 on the side wings of the sheets 30 are fitted onto the fixing projection 61. Accordingly, the sheets 30 are fixedly held by means of the fixing projection 61 as a supporting shaft. At this time, the fixing projection 61 protrudes upwardly to a height that corresponds to more than the sum of the thicknesses of the top plate 75 and the sheets 30. Accordingly, after being fixed onto the fixing projection 61, the sheets 30 are not easily slipped out from the fixing projection 61 by external impacts.

The holder 70 is inserted into an end of the mold frame 50 in such a manner that the fixing projection 61 is inserted into an insertion groove 74 of the top plate 75. In this case, the width of the insertion groove 74 corresponds to the diameter of the fixing projection 61. Accordingly, once the holder 70 is inserted into the mold frame 50, the holder 70 is not easily slipped out by external impacts.

A pair of support projections 62, for example, having a tetrahedral shape, are formed in the holding opening 60 on both sides of the fixing projection 61 escalated from the bottom of the holding opening 60. When the top plate 75 of the holder 70 is inserted into the end of the mold frame 50 and holds the sides of the sheets 30, the support projections 62 support the top plate 75 to serve as a stopper to prevent the holder 70 from pressing the sheets 30 excessively.

Figure 4:
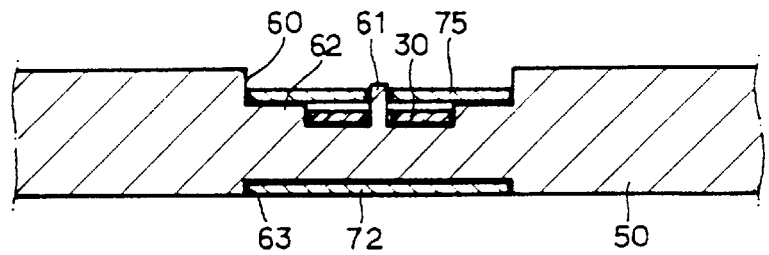
FIG. 4 is a cross sectional view of the holding assembly of FIG. 3.

As shown in FIG. 4, when the sheets 30 are settled in the mold frame 50 and fitted onto the fixing projection 61, the holder 70 is inserted into the end of the mold frame 50 in such a manner that the top plate 75 is inserted into the holding opening 60 and the bottom plate 72 is inserted into the fixing opening 63. In this case, it is apparent that the side plate 71 of the holder 70 is, as shown in FIG. 2, in contact with the top chassis 10 enclosing the mold frame 50 and the electromagnetic wave exhaust terminal 73 formed at the end of the bottom plate 72 is in contact with the earth terminal 24 of the PCB 21 located on the rear face of the mold frame 50.

When the present invention has the above-described structure, the fixing projection 61 is inserted into the sheets 30 in order and fixes the sheets 30 to the mold frame 50, and the top plate 75 prevents the sheets 30 from moving by holding the sheets without any direct contact with the sheets 30. In this case, the sheets 30 are supplied with a direct fixing effect by the fixing projection 61 and an indirect holding effect by the holder 70, whereby the sheets 30 can be fixedly held in the mold frame 50 without moving even at a strong external impact.

In the prior art, the sheets are fixed to the mold frame by direct contact with the fixing tape. In this case, the sheets may come in excessive contacts with the fixing tape and the fixing tape may limit the thermal expansion of the sheets 30. As a result, the surfaces of the sheets may wrinkle unexpectedly.

However, in the present invention, as aforementioned, the sheets 30 are partially fixed to the mold frame 50 by passage of the fixing projection 61 and prevented from moving by the indirect hold of the top plate 75 of the holder 70. Accordingly, the sheets 30 can be firmly fixed in the mold frame 50. In this case, even though the sheets 30 are expanded by the heat from the lamp, an enough thermal expansion space can be allowed because nothing, like a fixing tape, can limit the thermal expansion. Consequently, the sheets 30 may expand smoothly without any wrinkles and, accordingly, the display performance of the LCD according to the present invention can be remarkably enhanced.

Moreover, since the pressure by the holder 70 is limited by the support projections 62 serving as a stopper, the holder 70 does not press the sheets 30 more than needed, allowing the sheets 30 enough thermal expansion without any limitation.

As aforementioned, when the PCB 21 is located on the rear side of the mold frame 50, the holder 70 according to the present invention secondly holds the sheets 30 to prevent them from moving by being inserted into an end of the mold frame 50 and indirectly limiting the movements of the sheets 30 fixed by the fixing projection 61.

After all, the holder 70 of the present invention has the above-described structure for fixing the sheet as well as exhausting the electromagnetic wave which is a conventional PCB earth clip's function. Accordingly, electromagnetic waves emitted from the PCB 21 can be smoothly exhausted and the sheets 30 can be firmly held in the mold frame 50 without using any conventional fixing tape. It is apparent that the mold frame 50 should also be improved according to the holder 70 so that the mold frame 50 and the holder 70 form a complete holding assembly and the holder 70 can serve its full functions.

The holder 70 according to the first embodiment of the present invention can simultaneously exhaust the electromagnetic wave and fix the sheets. Accordingly, there is no need for manufacturers to provide the PCB earth clip for exhausting the electromagnetic wave emitted from the PCB 21 and the fixing tape for fixing the sheets 30 separately, enhancing the entire productivity considerably.

Figure 5:
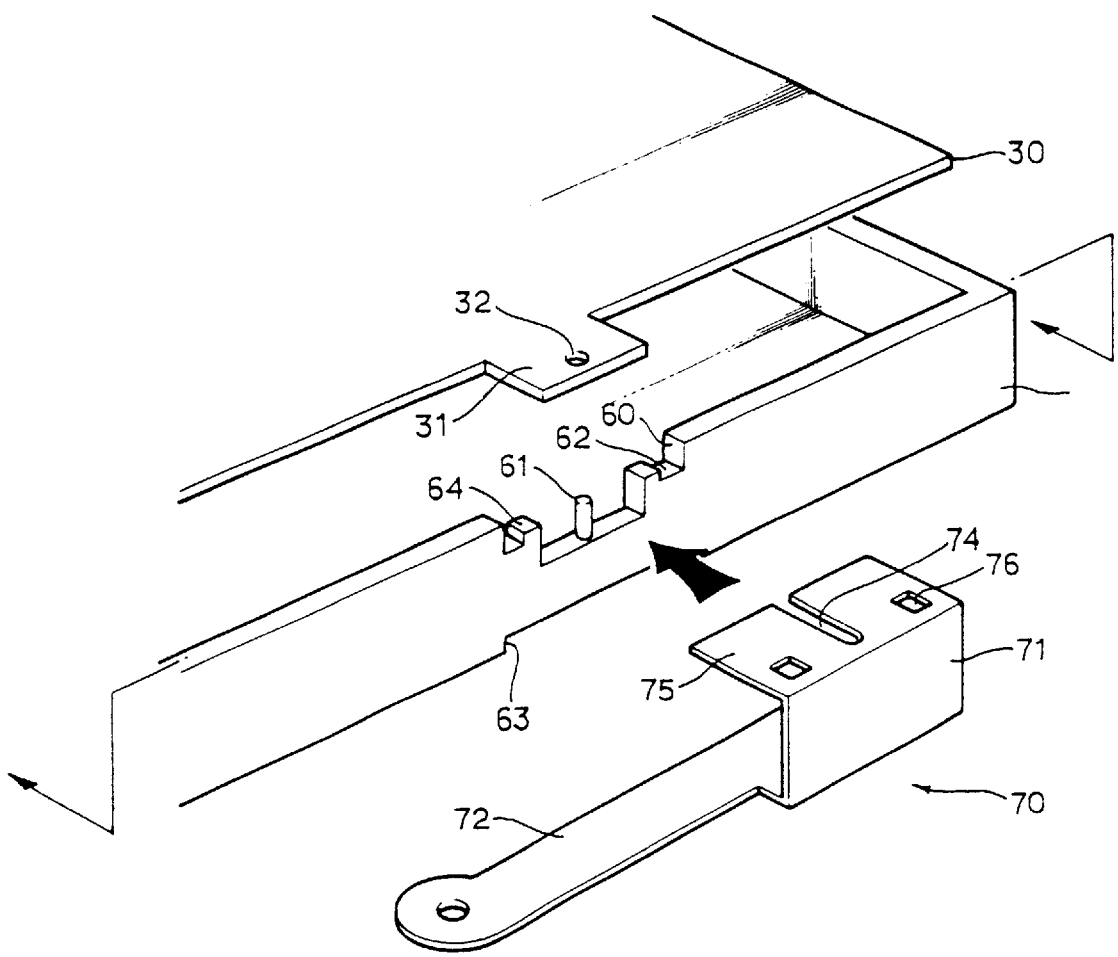
FIG. 5 is a perspective view of the details of a holding assembly of a second embodiment of an LCD module according to the present invention.
Figure 6:
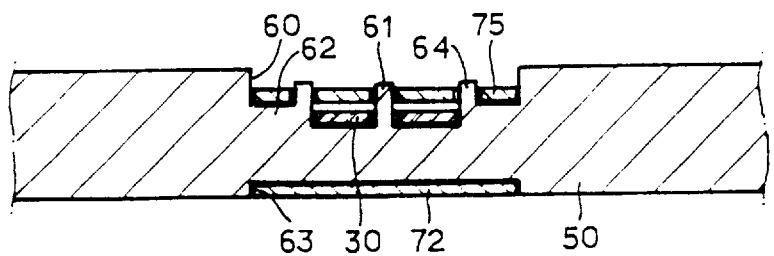
FIG. 6 is a cross sectional view of the holding assembly of FIG. 5.

On the other hand, according to another embodiment of the present invention, a locking projection 64 for locking the holder 70 is further formed on the fixing projection 62 as shown in FIGS. 5 and 6. A locking opening 76 for insertion of the locking projection 64 is further formed in the top plate 75 of the holder 70 corresponding to the locking projection 64.

When the sheets 30 are settled in the mold frame 50 and fitted onto the fixing projection 61, the holder 70 is, as aforementioned, inserted into the end of the mold frame 50 in such a manner that the top plate 75 is inserted into the holding opening 60 and the bottom plate 72 is inserted into the holder fixing opening 63.

As aforementioned, when the holder 70 is inserted into the holding opening 60 of the mold frame 50, the locking projection 64 is inserted into the locking to opening 76. Accordingly, the holder 70 is firmly fixed to the mold frame 50 with the locking projection 64 as a supporting shaft. At this time, the locking projection 76 protrudes upwardly by, for example, more than the thickness of the top plate 75. Accordingly, once the holder 70 is fixed to the locking projection 64, the holder 70 is not easily slipped out from the locking projection 64 even by a strong external impact.

It is apparent that, also in the second embodiment of the present invention, the pressure to the sheets by the holder 70 is limited by the support projection 62 serving as a stopper and, accordingly, the sheets 30 are not pressed more than needed. Therefore, an enough thermal expansion space for the sheets 30 can be ensured without any limitation.

The holder 70 according to the second embodiment of the present invention can simultaneously exhaust the electromagnetic wave and fix the sheet. Accordingly, there is no need for manufactures to provide the PCB earth clip for exhausting the electromagnetic wave from the PCB 21 and the fixing tape for fixing the sheets 30 separately, enhancing the entire productivity considerably.

Thereafter, the sheets 30 fixed in the mold frame 50 according to the present invention concentrate and diffuse lights supplied from the light guide plate 40 and outputs the light to the LCD panel 20. Then, the LCD panel 20 rapidly displays an appropriate display information.

As aforementioned, the present invention improves the structure of the PCB earth clip to have expanded functions, i.e., fixing the sheet as well as exhausting the electromagnetic wave. Thereby, the sheets can be appropriately fixed to the mold frame without using any fixing tape.

The present invention is useful for general LCDs, such as side-combining type LCDs.

This invention has been described above with reference to the aforementioned embodiments. It is evident, however, that many alternatives, modifications and variations will be apparent to those having skills in the art in light of the foregoing description. Accordingly, it is intended to embrace all such alternatives, modifications and variations as fall within the spirit and scope of the appended claims.

As aforementioned, in an LCD module according to the present invention and a holding assembly applied to the LCD, the holder is electrically connected to the earth terminal of the PCB and the top chassis to form an electromagnetic wave exhaust passage to exhaust the electromagnetic wave emitted from the PCB through the top chassis. In addition, when the sheets are settled in the mold frame, the holder is inserted into the holding opening of the mold frame so that the sheets can be stably held, preventing the sheets from moving in advance.

In this case, the holder can serve the typical electromagnetic wave exhausting function and the sheet fixing function. Consequently, there is no need to use the fixing tape for fixing the sheets and the sheets can be prevented from wrinkling on the surfaces in advance.

What is claimed is:

1. A liquid crystal display (LCD) module, comprising:
   a mold flame for accommodating a light guide plate, sheets and an LCD panel;
   a lamp arranged at an end of said mold flame, for supplying light to the LCD panel through the light guide plate and the sheets;
   a top chassis enclosing said mold flame;
   a printed circuit board (PCB) electrically connected to the LCD panel, including an earth terminal, for controlling the LCD panel; and
   a holder to which an end of said mold frame is inserted, for exhausting electromagnetic wave emitted from said PCB through said top chassis by electrically interconnecting the earth terminal of said PCB and said top chassis, as well as for holding the sheets inserted within said mold frame.

2. The LCD module according to claim 1, wherein said holder is folded twice to form a top pate, a side plate and a bottom plate, and said mold frame is inserted into said holder in such a manner that said side plate is facing a side of said mold frame and an end of said bottom plate extends in the direction of the length of said holder to contact the earth terminal of said PCB.

3. The LCD module according to claim 1, wherein said mold frame further includes a holding opening at a side wall of said mold frame corresponding to said holder and a holding area of the sheets, for easily holding said holder and side wings of the sheets.

4. The LCD module according to claim 3, wherein the holding opening further includes a fixing projection formed by protruding said mold frame upwardly, for fixing the sheets.

5. The LCD module according to claim 4, wherein the holding opening further includes a pair of support projections formed on both sides of the fixing projection by escalating from the bottom of the holding opening, for supporting said holder and preventing said holder from excessively pressing the sheets.

6. The LCD module according to claim 5, wherein the fixing projection further includes a locking projection for locking said holder and said holder further includes a locking opening formed corresponding to said locking projection, for insertion of the locking projection.

7. A holding assembly for an LCD module, comprising:
   a mold flame including a holding opening, for exposing sides of internal objects settled therein;
   a clip-shaped holder inserted into the holding opening so that the exposed sides of the objects are held,
   wherein the holding opening includes:
      a fixing projection formed by protruding said mold flame upwardly for fixing the internal objects; and
      a pair of support projections formed on both sides of said fixing projection by protruding said mold frame upwardly for supporting said holder and preventing said holder from excessively pressing the internal objects.

8. The holding assembly according to claim 7, wherein the support projection further includes a locking projection for locking said holder and said holder further includes a locking opening formed corresponding to the locking projection, for insertion of the locking projection.

* * * * *